Patented Aug. 14, 1945

2,382,904

UNITED STATES PATENT OFFICE 2,382,904

STABILIZATION OF ORGANIC SUBSTANCES

Charles J. Pedersen, Penns Grove, N. J., assignor to E. I. du Pont de Nemours & Company, Wilmington, Del., a corporation of Delaware No Drawing. Application October 10, 1942, Serial No. 461,632

16 Claims. (Cl. 260—799)

This invention relates to the stabilization of organic substances and particularly to the stabilization of such substances which are subject to deterioration caused by the action of molecular oxygen and catalyzed by metals and their compounds Many organic products, such as fats, drying oil, rubber, petroleum products, photographic developers and synthetic unsaturated compounds, are readily attacked by oxygen and the resulting deterioration imparts undesirable qualities to them and eventually destroys their usefulness.

Signal success has been achieved in recent years, in the preservation of many organic substances, by the discovery and use of compounds generically called "oxidation inhibitors" or "antioxidants." These agents, mostly oxidizable organic compounds, retard the auto-catalytic process. Since antioxidants are themselves oxidized in the course of time, as a result of auto-oxidation, the beneficial effect obtained by their use is not permanent, and they protect the organic substances only so long as they are not rendered inactive. They are, moreover, very specific in action, each group of auto-oxidizable substances requiring a different type of antioxidant for the best results.

Vanadium, chromium, manganese, iron, cobalt, copper and their catalytically active compounds accelerate the rate of oxidation of many organic substances. For example, it is well known that copper compounds speed the formation of gum in cracked gasoline and the aging of rubber; that cobalt compounds promote the oxidation of drying oils; and that iron compounds catalyze the deterioration of lubricating oils. They also accelerate the oxidation of aromatic hydroxy and amino antioxidants used to stabilize these oxidizable substances. Hence, these metal catalysts and the antioxidants are antagonistic in action, and the normal inhibiting effect of the latter is greatly reduced in the presence of the former.

Metal compounds occur naturally in many organic products, but often in such slight traces as to cause very little harm. Their concentrations, however, are frequently raised during the course of handling and utilizing the products; vessels and conduits made of metals containing copper or iron are used for storage and transportation, or ingredients contaminated with metal compounds might be added.

The harm done by these extraneous catalysts may be prevented by at least three methods: (1) their removal by purification, but often this is practically impossible of accomplishment and usually too costly to be economically feasible, (2) the addition of a sufficient amount of an antioxidant so that its preserving effect is equal or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization, and (3) the suppression of the catalytic activity of the metal compounds by chemical means without physically removing them from the system.

It is an object of the present invention to retard the deterioration of organic substances caused by the action of molecular oxygen and promoted by the presence of certain metal catalysts and their catalytically active compounds. Another object is to render antioxidants, which are relatively ineffective in the presence of metal catalysts and their catalytically active compounds, effective to inhibit the oxidation of oxidizable organic substances even in the presence of metal catalysts and their catalytically active compounds. A further object is to provide a new class of metal deactivators which are effective to render metal catalysts inactive to catalyze the oxidation of oxidizable organic substances containing or in contact with such metal catalysts. A more particular object is to inhibit the deterioration of petroleum hydrocarbons in the presence of metal catalysts and their catalytically active compounds. Other objects are to provide new compositions of matter and to advance the art. Still other objects will appear hereinafter The above and other objects may be accomplished in accordance with my invention which comprises adding to organic substances, normally subject to deterioration caused by the action of molecular oxygen, and containing a catalyst of the group of chromium, iron, copper and their compounds, normally effective to catalyze oxidation of such organic substances, a small proportion of an antioxidant, normally effective to materially retard such deterioration in the absence of said catalyst, but which is less effective in the presence of said catalyst, and a small proportion, sufficient to deactivate said catalyst, of a metal deactivator having the formula

wherein A and B are divalent organic radicals, aromatic in nature, in which the free valences are on adjacent carbon atoms. I have found that such metal deactivators are capable of effectively suppressing the catalytic activity of chromium, iron, copper and their catalytically active compounds and hence will render such catalysts ineffective to catalyze the oxidation of the organic substance and the antioxidant and will render the antioxidant effective to retard the oxidation of the organic substance.

The organic substances, which may be treated in accordance with my invention, include animal and vegetable fats and oils, edible oils, fruit and vegetable juices, textile fibres, photographic developers, antioxidants, synthetic unsaturated compounds, petroleum hydrocarbons, rubber and the like. My metal deactivators are particularly desirable in rubber and in liquid petroleum hydrocarbons and especially in gum-forming hydrocarbon distillates, such as, for example, cracked gasoline. The organic substance, particularly the petroleum hydrocarbons, will also contain an antioxidant which is normally effective to materially retard the deterioration or oxidation of the organic substance in the absence of the catalytically active metal, but which is less effective in the presence of such metals.

The metal deactivators of my invention comprise the broad group of compounds represented by the formula

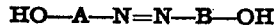

wherein A and B are the same or different divalent organic radicals, aromatic in nature, wherein the two free valences are on adjacent carbon atoms. It is not necessary that both A and B be aromatic radicals, that is, contain benzene rings, provided they are aromatic in nature so that the hydroxyl groups attached to the radicals are phenolic in character rather than alcoholic. The radicals A and B may contain non-hydrocarbon radicals, such as nitro and sulfonic groups, but such groups are generally undesirable since they reduce the weight effectiveness of the compounds and, unlike the hydrocarbon substituents, tend to decrease the solubility of the compounds in organic substances. Preferably, the metal deactivators are free of strongly acidic substituents. Also preferably, both A and B are divalent organic radicals of the benzene, naphthalene and pyrazolone series in which the free valences are on adjacent ring carbon atoms. The most effective compounds appear to be those in which both A and B are divalent aromatic radicals, particularly of the benzene series, in which the free valences are on adjacent ring carbon atoms in benzene rings. I particularly prefer azobenzene which contains, as the sole substituents, from 2 to 4 hydroxy groups, each benzene ring having a hydroxy group in the position ortho to the azo group.

Definite operative concentrations of the metal deactivator in the organic substance cannot be specified for each case as the quantity required is dependent upon the amount of metal catalyst present in the organic substance. The metal deactivator should be present in the proportion of approximately 5 to 10 times the amount of the metal catalyst present, on the basis of the metallic element in order to obtain complete deactivation of the metal catalyst. Higher proportions of metal deactivator may be employed, particularly when a reservoir of metal is present in the form of metal in bulk in contact with the organic substance. Generally, from about 0.0001% to about 0.1%, based on the weight of the organic substance, will be sufficient for most purposes, particularly when the organic substance is a liquid petroleum hydrocarbon, such as a gum-forming hydrocarbon distillate of the character of cracked gasoline. When the organic substance is rubber, it will generally be desired to employ larger amounts of the metal deactivators up to about 1% and preferably in the proportion of about 0.5%.

The catalytically active metal and its compounds may be dissolved in the organic substance or suspended therein or may be in the form of metal in bulk in intimate contact with the organic substance. It will be understood that, when I refer to an organic substance containing a catalyst, I mean to include those cases wherein the metal in bulk form is in contact with the organic substance, as well as those cases wherein the catalytically active metal is dissolved or suspended in the organic substance.

The deactivators may be added to the oxidizable organic substances to be protected in any form and manner. They may be in solid or liquid form, mixed with other additional agents or dissolved in a solvent. They may be dissolved in the organic substance or dispersed therein in any suitable manner. They may be added to the finished organic substance or to the organic substance at any stage in its manufacture.

In order to avoid confusion arising from a superabundance of data, cracked gasoline has been selected as an example of an auto-oxidizable organic substance for the purposes of illustration. The samples of gasoline used in the following tests were either cracked gasolines or blends of cracked and straight-run gasolines, completely refined, but otherwise untreated with chemical agents, such as dyes, anti-knocks and antioxidants. Since gasoline is a mixture of variable composition, identical results are not obtained with different samples. The magnitude of the effects is great enough, however, to render this difference relatively insignificant.

p-Benzylaminophenol, abbreviated BAP, has been chosen as a representative gasoline antioxidant. The metals, present as catalysts, were employed as their oleates. The concentrations of the antioxidants and the metal deactivators are given in weight percent in gasoline. The concentrations of the metals are given in parts per million by weight of the metal rather than by weight of the metal oleate.

The term "stabilized gasoline" is employed to denote gasoline to which has been added an antioxidant in sufficient quantity to significantly increase its induction period in the absence of added metal catalysts.

The accelerated method, used for determining the induction periods given below, was the one described in J. I. E. C. 25, 397 (1933). It consists in heating 100 cc. of gasoline at 100° C. in a 1 liter Pyrex flask containing pure oxygen. The internal pressure is observed every 10 minutes by means of a manometer attached to the system. The elapsed time from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

Table I

[Induction period of control—100 minutes]

[This gasoline, containing 0.001% BAP and having an induction period of 250 minutes in the absence of copper, was used for the tests.]

| Conc. Cu [1] | Induction period in minutes | |
|---|---|---|
| | No deactivator | 0.001% 2,2'-dihydroxyazobenzene |
| P. P. M. 1.0 | 60 | 230 |

[1] As cupric oleate.

It will be observed that, at 0.001%, 2,2'-dihydroxyazobenzene suppresses almost completely the catalytic activity of 0.0001% soluble copper.

Table II

| No. | Conc. BAP | Area of metallic Cu | Compound | Conc. | Ind. per. |
|---|---|---|---|---|---|
| | Wt. % | Sq. in. | | Wt. % | Minutes |
| 1 | 0.0 | 0.0 | None | | 80 |
| 2 | 0.001 | 0.0 | do | | 210 |
| 3 | 0.001 | 0.5 | do | | 60 |
| 4 | 0.001 | 0.5 | 1-(2'-hydroxyphenylazo)-2-naphthol. | 0.01 | 240 |

It will be observed that the catalytic action of metallic copper is suppressed by the azo compound.

It is not necessary that both A and B in HO—A—N=N—B—OH be aromatic radicals, provided they are aromatic in nature, that is, the hydroxyl groups attached to the radicals are phenolic in property rather than alcoholic.

The action of a number of such effective compounds are shown in Table III.

Table III

| No. | Conc. BAP | Conc. Cu | Compound | Conc. | Ind. per. |
|---|---|---|---|---|---|
| | Wt. % | P.P.M. | | Wt. % | Minutes |
| 1 | 0.0 | 0.0 | None | | 70 |
| 2 | 0.0025 | 0.0 | do | | 270 |
| 3 | 0.0025 | 1.76 | do | | 70 |
| 4 | 0.0025 | 1.76 | Diazotized 2-aminophenol coupled to 1-phenyl-3-methyl-5-pyrazolone. | 0.005 | 340 |
| 5 | 0.0025 | 1.76 | Diazotized 2-amino-4-chlorophenol coupled to 1-phenyl-3-methyl-5-pyrazolone. | 0.005 | 330 |
| 6 | 0.0025 | 1.76 | Diazotized 2-amino-5-chlorophenol coupled to 1-phenyl-3-methyl-5-pyrazolone. | 0.005 | 320 |
| 7 | 0.0025 | 1.76 | Diazotized 2-amino-4,6-dichlorophenol coupled to 1-phenyl-3-methyl-5-pyrazolone. | 0.005 | 250 |
| 8 | 0.0025 | 1.76 | Diazotized 2-aminophenol coupled to acetoacetanilide. | 0.005 | 140 |

1-phenyl-3-methyl-5-pyrazolone is

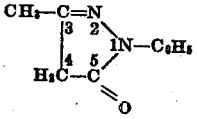

Diazotized 2-aminophenol coupled to 1-phenyl-3-methyl-5-pyrazolone (No. 4 in above table) is

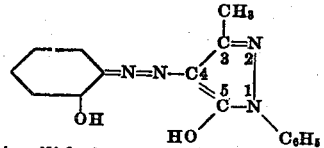

Acetoacetanilide is

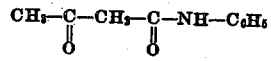

Diazotized 2-aminophenol coupled to acetoacetanilide (No. 8 in above table) is

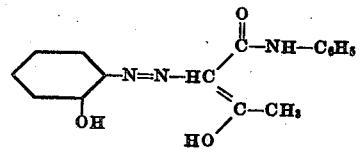

Table IV

| No. | Conc. BAP | Conc. Cu | Compound | Conc. | Ind. per. |
|---|---|---|---|---|---|
| | Wt. % | P.P.M. | | Wt. % | Minutes |
| 1 | 0.0 | 0.0 | None | | 140 |
| 2 | 0.0005 | 0.0 | do | | 270 |
| 3 | 0.0005 | 1.0 | do | | 160 |
| 4 | 0.0005 | 1.0 | 2, 4, 6, 2'-tetrahydroxyazobenzene | 0.001 | 260 |
| 5 | 0.0005 | 1.0 | 2, 4, 6-trihydroxyazobenzene | 0.001 | 150 |

It will be noted that, while 2,4,6,2'-tetrahydroxyazobenzene (No. 4) overcomes the catalytic effect of copper, 2,4,6-trihydroxyazobenzene (No. 5) is inert, indicating that the mere presence of two ortho-hydroxyl groups does not confer metal deactivating power, but that it is necessary that at least one ortho-hydroxyl group be present on each side of the azo linkage.

There are groups, besides the hydroxyl, such as the amino and the carboxyl, which confer metal deactivating power, but they are less effective. This is shown in Tables V and VI.

Table V

| No. | Conc. BAP | Conc. Cu | Compound | Conc. | Ind. per. |
|---|---|---|---|---|---|
| | Wt. % | P.P.M. | | Wt. % | Minutes |
| 1 | 0.0 | 0.0 | None | | 110 |
| 2 | 0.001 | 0.0 | do | | 250 |
| 3 | 0.001 | 1.0 | do | | 60 |
| 4 | 0.001 | 1.0 | 2, 4, 2'-trihydroxyazobenzene | 0.0011 | 300 |
| 5 | 0.001 | 1.0 | 2-hydroxy 2', 4'-diaminoazobenzene | 0.005 | 210 |

Table VI

| No. | Conc. BAP | Conc. Cu | Compound | Conc. | Ind. per. |
|---|---|---|---|---|---|
| | Wt. % | P.P.M. | | Wt. % | Minutes |
| 1 | 0.0 | 0.0 | None | | 180 |
| 2 | 0.002 | 0.0 | do | | 370 |
| 3 | 0.002 | 1.0 | do | | 30 |
| 4 | 0.002 | 1.0 | 2, 4, 2'-trihydroxyazobenzene | 0.002 | 350 |
| 5 | 0.002 | 1.0 | 2-hydroxy-5-methyl-2-carboxy-azobenzene | 0.005 | 240 |

Copper is one of the most potent catalysts for the oxidation of many organic products. It is the most powerful and one of the commonest metal contaminants in gasoline. Other metals, however, possess different degrees of catalytic activity.

The action of certain catalysts on stabilized gasoline and the effects of 2,2',4'-trihydroxyazobenzene on their activity are shown in Table VII.

Table VII

[Induction period of control—130 minutes]

[This gasoline, containing 0.002% p-(n-butyl-amino)-phenol and having an induction period of 505 minutes in the absence of metal catalysts, was used for the tests, the results of which are presented below.]

| No. | Metal catalyst [1] | Conc. | Induction period in minutes | |
|---|---|---|---|---|
| | | | No deactivator | 0.002% 2,2',4'-trihydroxyazobenzene |
| | | P. P. M. | | |
| 1 | Chromium | 0.81 | 475 | 505 |
| 2 | Iron | 0.87 | 485 | 505 |
| 3 | Copper | 1.0 | 50 | 525 |

[1] The metal catalysts were added as the oleates.

It will be noted that chromium and iron, besides copper, shorten the induction period of stabilized gasoline, and that 2,2',4'-trihydroxyazobenzene counteracts the action of all these metals.

The deactivators are also effective in decreasing the copper dish gum, when used in combination with an antioxidant. This is shown by the data in Tables VIII and IX.

Table VIII

| No. | Conc. BAP | Conc. 2,4,2'-trihydroxyazobenzene | Copper dish gum |
|---|---|---|---|
| | Wt. % | Wt. % | Mg./100 cc. |
| 1 | 0.0 | 0.0 | 290 |
| 2 | 0.00325 | 0.0 | 196 |
| 3 | 0.00325 | 0.005 | 104 |

Table IX

| No. | Conc. BAP | Conc. 2,4,2'-trihydroxyazobenzene | Copper dish gum |
|---|---|---|---|
| | Wt. % | Wt. % | Mg./100 cc. |
| 1 | 0.0 | 0.0 | 190 |
| 2 | 0.003 | 0.0 | 76 |
| 3 | 0.003 | 0.005 | 32 |

It has long been recognized that small traces of copper have a very pronounced catalytic effect on the oxidation of rubber. In order to overcome this difficulty, it has been necessary to establish rigorous specifications for the copper content of compounding agents used in rubber. In many cases, particularly with dyes, the removal of traces of copper is both troublesome and expensive.

In general, the common antioxidants used in rubber are unable to suppress the catalytic action of copper. The metal deactivators, however, have been found to be effective for this purpose.

Since the azo compounds of my invention are not antioxidants, generally, they were tested in a rubber stock containing 1% of phenyl-β-naphthylamine as an added antioxidant. The bomb physical test was used as a method of evaluation. The following stock was used in the tests.

| | |
|---|---|
| Rubber | 100 |
| Zinc oxide | 100 |
| Sulfur | 3 |
| Stearic acid | 1 |
| Lithopone | 20 |
| Di-o-tolyl guanidine | 0.75 |
| Phenyl-β-naphthylamine | 1.0 |
| Copper stearate | 0.05 |

The stock was cured for 45 minutes at 40 pounds steam pressure. The results of the bomb tests are given in Table X.

Table X

| No. | Days at 70° C. and 300 lbs. oxygen | No azo compound added | | +0.5% 2,4,2'-trihydroxy azobenzene | | +0.5% 2-hydroxy-5-methylazobenzene | |
|---|---|---|---|---|---|---|---|
| | | Tensile [1] | % el.[2] | Tensile | % el. | Tensile | % el. |
| 1 | 0 | 3,325 | 640 | 3,525 | 680 | 3,475 | 660 |
| 2 | 2 | 475 | 300 | 3,200 | 660 | ([3]) | |
| 3 | 5 | ([3]) | | 2,875 | 620 | | |
| 4 | 7 | | | 2,975 | 620 | | |
| 5 | 10 | | | 2,475 | 600 | | |
| 6 | 12 | | | 2,400 | 600 | | |
| 7 | 14 | | | 2,275 | 580 | | |
| 8 | 17 | | | 2,175 | 600 | | |

[1] Tensile strength in lbs./sq. in.
[2] % elongation.
[3] Melted off.

It will be noted that, while the compound having an ortho-hydroxyl group on each side of the azo linkage is effective, that having an ortho-hydroxyl group on only one side is not.

It will be understood that the experiments and tests, hereinbefore given, have been given for illustrative purposes only. Many variations and modifications can be made in my invention without departing from the spirit or scope thereof. The metal deactivators of my invention can be employed in other organic substances, the metals may be present in other forms and other compounds, within the broad scope of my invention, may be substituted for the compounds specifically referred to hereinbefore. While I have disclosed the use of single metal deactivators, it will be apparent that mixtures of two or more metal deactivators of my invention may be employed if desired.

Besides many others, the following compounds are metal deactivators within the scope of my invention:

2,2',4'-trihydroxy-5-(ter.-butyl)-azobenzene
2,2'-dihydroxy-5,5'-dimethylazobenzene
2,2'-dihydroxy-5,5'-di-(ter.-butyl)-azobenzene
2,2'-dihydroxy-3,3',5,5'-tetramethylazobenzene
2-hydroxy-5-(ter.-butyl)-phenylazo-beta-naphthol
2,2',4,4'-tetrahydroxyazobenzene
Diazotized 2-amino-4-(ter.-butyl)-phenol coupled to 1-phenyl-3-methyl-5-pyrazolone
Diazotized 2-amino-4-methylphenol coupled to acetoacetanilide
Diazotized 3-amino-2-naphthol coupled to resorcinol It will be apparent that, by my invention, I am able to effect the stabilization of organic substances susceptible to the harmful action of molecular oxygen catalyzed by chromium, iron, copper and their catalytically active compounds. This stabilization may be accomplished, in accordance with my invention, by the addition of metal deactivators in combination with an amount of an antioxidant, sufficient to stabilize the substance in the absence of the metal catalyst. It is technically and economically unfeasible to counteract the catalytic effects of such metals by means of an antioxidant alone. I believe that the metal deactivators of my invention function by forming very stable complexes with the metals, which complexes are catalytically inactive. It appears that the metal deactivators of my invention, in general, are not antioxidants and for practical purposes, they must be employed in combination with antioxidants. It will be understood that, while I have advanced a theory as to the action of the metal deactivators, my invention is not to be limited by any theory as to the manner in which the metal deactivators function to produce the results.

I claim:

1. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent organic radicals of the group consisting of the radicals of the benzene, naphthalene and pyrazolone series in which the free valences are on adjacent ring carbon atoms, the antioxidant and the metal deactivation being different chemical compounds.

2. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent organic radicals of the group consisting of the radicals of the benzene, naphthalene and pyrazolone series in which the free valences are on adjacent ring carbon atoms and which metal deactivator is free of substituents more strongly acidic than phenolic hydroxy groups, the antioxidant and the metal deactivator being different chemical compounds.

3. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent aromatic radicals in which the free valences are on adjacent ring carbon atoms in benzene rings and which metal deactivator is free of substituents more strongly acidic than phenolic hydroxy groups, the antioxidant and the metal deactivator being different chemical compounds.

4. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is a 2,2'-dihydroxyazobenzene which is free of substituents more strongly acidic than phenolic hydroxy groups, the antioxidant and the metal deactivator being different chemical compounds.

5. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is azobenzene containing, as the sole substituents, from 2 to 4 hydroxy groups, each benzene ring having a hydroxy group in the position ortho to the azo group, the antioxidant and the metal deactivator being different chemical compounds.

6. A composition comprising an organic substance, normally subject to deterioration caused by the action of molecular oxygen, containing a catalyst of the group consisting of chromium, iron, copper and their compounds, normally effective to catalyze oxidation of said organic substance, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is 2,4,2'-trihydroxyazobenzene, the antioxidant and the metal deactivator being different chemical compounds.

7. A composition comprising petroleum hydrocarbons, normally subject to deterioration caused by the action of molecular oxygen, containing a catalyst of the group consisting of chromium, iron, copper and their compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent aromatic radicals in which the free valences are on adjacent carbon atoms, the antioxidant and the metal deactivator being different chemical compounds.

8. A composition comprising petroleum hydrocarbons, normally subject to deterioration caused by the action of molecular oxygen, containing a catalyst of the group consisting of chromium, iron, copper and their compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent organic radicals of the group consisting of the radicals of the benzene, naphthalene and pyrazolone series in which the free valences are on adjacent ring carbon atoms and which metal deactivator is free of substituents more strongly acidic than phenolic hydroxy groups, the antioxidant and the metal deactivator being different chemical compounds.

9. A composition comprising cracked gasoline, normally subject to deterioration caused by the action of molecular oxygen, containing a catalyst of the group consisting of chromium, iron, copper and their compounds, normally effective to catalyze oxidation of said cracked gasoline, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent aromatic radicals in which the free valences are on adjacent carbon atoms and which metal deactivator is free of substituents more strongly acidic than phenolic hydroxy groups, the antioxidant and the metal deactivator being different chemical compounds.

10. A composition comprising cracked gasoline, normally subject to deterioration caused by the action of molecular oxygen, containing a catalyst of the group consisting of chromium, iron, copper and their compounds, normally effective to catalyze oxidation of said cracked gasoline, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent organic radicals of the group consisting of the radicals of the benzene, naphthalene and pyrazolone series in which the free valences are on adjacent ring carbon atoms and which metal deactivator is free of substituents more strongly acidic than phenolic hydroxy groups, the antioxidant and the metal deactivator being different chemical compounds.

11. A composition comprising cracked gasoline, normally subject to deterioration caused by the action of molecular oxygen, containing a catalyst of the group consisting of chromium, iron, copper and their compounds, normally effective to catalyze oxidation of said cracked gasoline, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is azobenzene containing, as the sole substituents, from 2 to 4 hydroxy groups, each benzene ring having a hydroxy-group in the position ortho to the azo group, the antioxidant and the metal deactivator being different chemical compounds.

12. A composition comprising cracked gasoline, normally subject to deterioration caused by the action of molecular oxygen, containing a catalyst of the group consisting of chromium, iron, copper and their compounds, normally effective to catalyze oxidation of said cracked gasoline, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is 2,4,2'-trihydroxyazobenzene, the antioxidant and the metal deactivator being different chemical compounds.

13. A composition comprising rubber, normally subject to deterioration caused by the action of molecular oxygen, containing a catalyst of the group consisting of chromium, iron, copper and their compounds, normally effective to catalyze oxidation of said rubber, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent aromatic radicals in which the free valences are on adjacent carbon atoms, the antioxidant and the metal deactivator being different chemical compounds.

14. A composition comprising rubber, normally subject to deterioration caused by the action of molecular oxygen, containing a catalyst of the group consisting of chromium, iron, copper and their compounds, normally effective to catalyze oxidation of said rubber, a small proportion of an antioxidant, normally effective to materially retard such deterioration in the absence of said catalyst but which is less effective in the presence of said catalyst, and having incorporated therein a metal deactivator, in a small proportion sufficient to deactivate said catalyst, having the formula

HO—A—N=N—B—OH wherein A and B are divalent organic radicals of the group consisting of the radicals of the benzene, naphthalene and pyrazolone series in which the free valences are on adjacent ring carbon atoms and which metal deactivator is free of substituent more strongly acidic than phenolic hydroxy groups, the antioxidant and the metal deactivator being different chemical compounds.

15. A composition comprising rubber, normally subject to deterioration caused by the action of molecular oxygen, containing a catalyst of the group consisting of chromium, iron, copper and their compounds, normally effective to catalyze oxidation of said rubber, a small proportion of an antioxidant, normally effective to materially retard such deterioration in the absence of said catalyst but which is less effective in the presence of said catalyst, and having incorporated therein a metal deactivator in a small proportion sufficient to deactivate said catalyst which metal deactivator is 2,4,2'-trihydroxyazobenzene, the antioxidant and the metal deactivator being different chemical compounds.

16. The method of inhibiting the catalytic oxidation of an organic substance caused by a catalyst of the group consisting of chromium, iron, copper and their compounds which comprises incorporating in said oragnic substance a small proportion of an antioxidant, normally effective to materially retard such deterioration in the absence of said catalyst but which is less effective in the presence of said catalyst, and a small proportion, sufficient to deactivate said catalyst, of a metal deactivator having the formula

HO—A—N=N—B—OH wherein A and B are divalent organic radicals of the group consisting of radicals of the benzene, naphthalene and pyrazolone series, in which the free valences are on adjacent carbon atoms, the antioxidant and the metal deactivator being different chemical compounds.

CHARLES J. PEDERSEN.